(12) United States Patent
Manghi et al.

(10) Patent No.: US 6,328,153 B1
(45) Date of Patent: Dec. 11, 2001

(54) DEVICE FOR FEEDING LAYERS OF OBJECTS TO A PALLETIZING PLANT

(75) Inventors: Francesco Manghi; Ciro Correggi, both of Montecchio Emilia (IT)

(73) Assignee: Zecchetti S.R.L., Montecchio Emilia (IT)

( * ) Notice: Subject to any disclaimer, the term of this patent is extended or adjusted under 35 U.S.C. 154(b) by 0 days.

(21) Appl. No.: 09/281,003

(22) Filed: Mar. 30, 1999

(30) Foreign Application Priority Data

Apr. 21, 1998 (IT) ............................................... RE98A0045

(51) Int. Cl.⁷ .................................................... B65G 25/00
(52) U.S. Cl. ...................... 198/736; 198/747; 198/468.11
(58) Field of Search .............................. 198/418.6, 468.6, 198/468.9, 468.11, 736, 739, 740, 747; 53/445, 474, 154, 155, 168

(56) References Cited

U.S. PATENT DOCUMENTS

| | | | |
|---|---|---|---|
| 2,094,497 | * 9/1937 | Ross | 198/740 |
| 3,217,858 | * 11/1965 | Fellner et al. | 198/739 |
| 4,343,390 | * 8/1982 | Laub, III | 198/747 |
| 4,365,705 | * 12/1982 | Zinck et al. | 198/418.6 |
| 5,333,721 | * 8/1994 | Stevie | 198/418.6 |
| 5,489,185 | * 2/1996 | Reichert | 198/468.11 |

FOREIGN PATENT DOCUMENTS 2-127224 * 5/1990 (JP) ................................... 198/418.6

* cited by examiner

Primary Examiner—Dean J. Kramer

(57) ABSTRACT

A device for feeding layers of products to a palletizing plant, containing an accumulation surface arranged to receive lines of products transferred from a conveyor positioned in front of it by a pusher which acts in a direction perpendicular to the conveyor axis and parallel to the axis of the accumulation surface; the device including at least two parallel, coplanar conveyors of different type positioned in front of the accumulation surface and associated with the pusher supported by an upper structure in such a manner as to be free to move vertically and free to move in the direction of the axis of the accumulation surface.

13 Claims, 6 Drawing Sheets

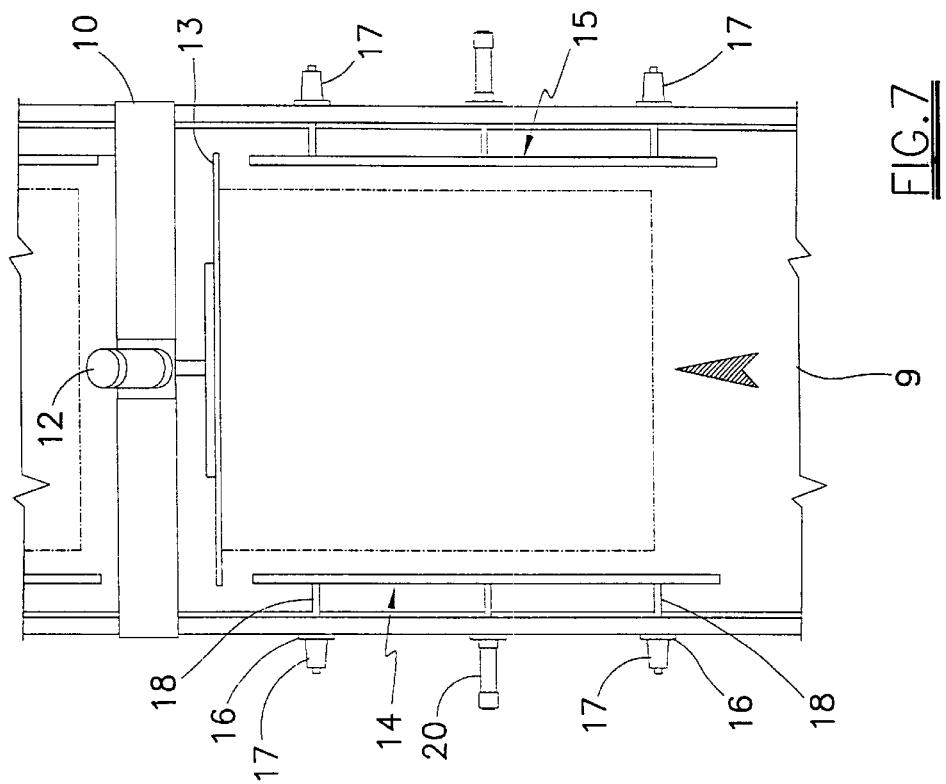
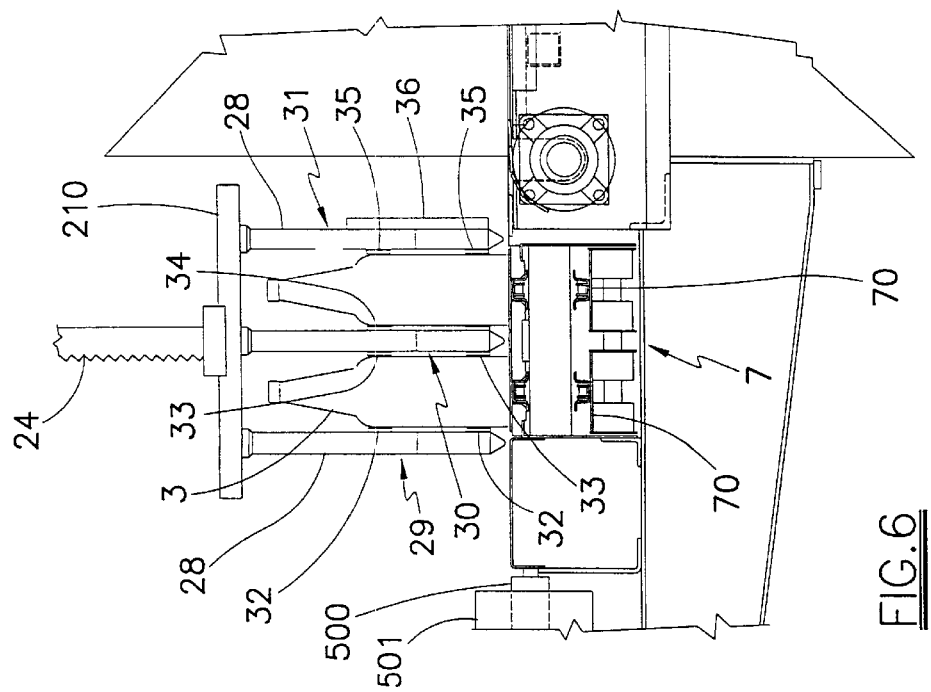

DEVICE FOR FEEDING LAYERS OF OBJECTS TO A PALLETIZING PLANT

FIELD OF THE INVENTION

The present invention relates to feed devices or palletizing plants.

BACKGROUND OF THE INVENTION

Known palletizing plants enable stacks of goods of one and the same type to be formed into layers, each layer being formed from several adjacent stacks of the same product. The layer forming device varies in known plants depending on the type of product to be palletized. Hence if the type of product varies, the type of layer forming device also has to be changed. This represents a limit in current plants in that to change the feed device in those palletizing plants in which this is possible, the plant has to be halted for a certain time with a resultant loss of production.

SUMMARY OF THE INVENTION

The object of the present is to overcome the aforesaid drawbacks by providing a layer-forming device able to operate on at least two different types of product, for example bottles and boxes. The feed device of the invention comprises at least two parallel, coplanar lines arranged side-by-side to form at least one row of different products on each of them. The lines are positioned in front of a moving accumulation surface, such as a conveyor belt, on which the layers of products are formed. Each of said at least two lines can be fed with a certain type of product by a usual conveyor means positioned upstream of it.

The present invention comprises a movable pusher able to transfer that portion of the product row facing said moving accumulation surface from one of said at least two row-forming lines to said surface. There are also provided means to form layers from rows of products of one and the same type and means for compacting said layers. According to the present invention the movable pusher is suspended from an upper guide and is free to move in a vertical direction. It is also provided with means for interacting with two different types of product.

In order to clarify the operational and constructional characteristics of the invention a preferred embodiment thereof is described hereinafter by way of a non-limiting example and illustrated on the accompanying drawings.

BRIEF DESCRIPTION OF THE DRAWINGS

FIG. 6 is an enlarged view of one of the components of the invention.

FIG. 7 is an enlarged view or a second component of the invention.

DESCRIPTION OF THE PREFERRED EMBODIMENT

Figure 1:
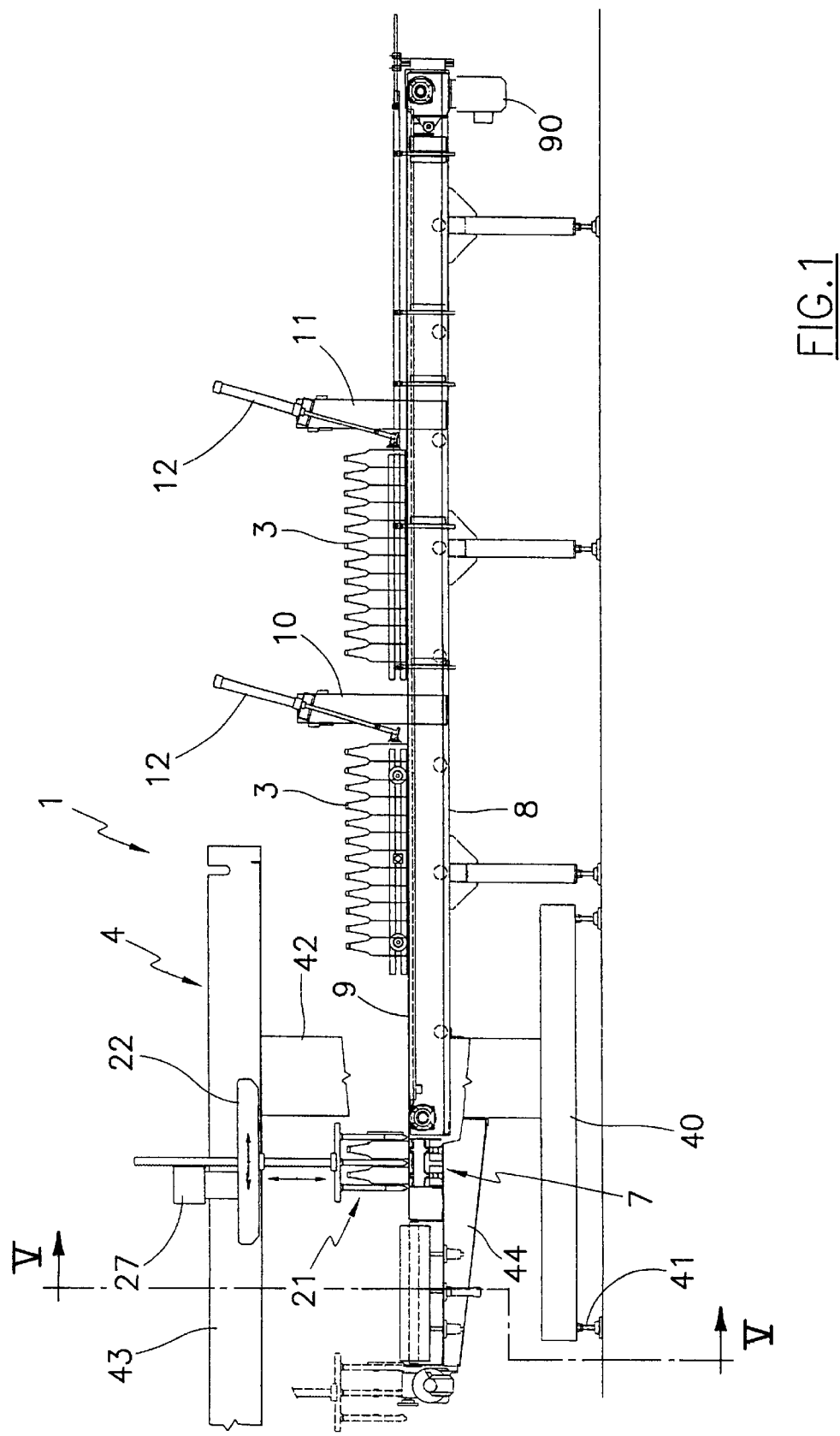
FIG. 1 is a partly sectional side view of the device of the present invention.
Figure 2:
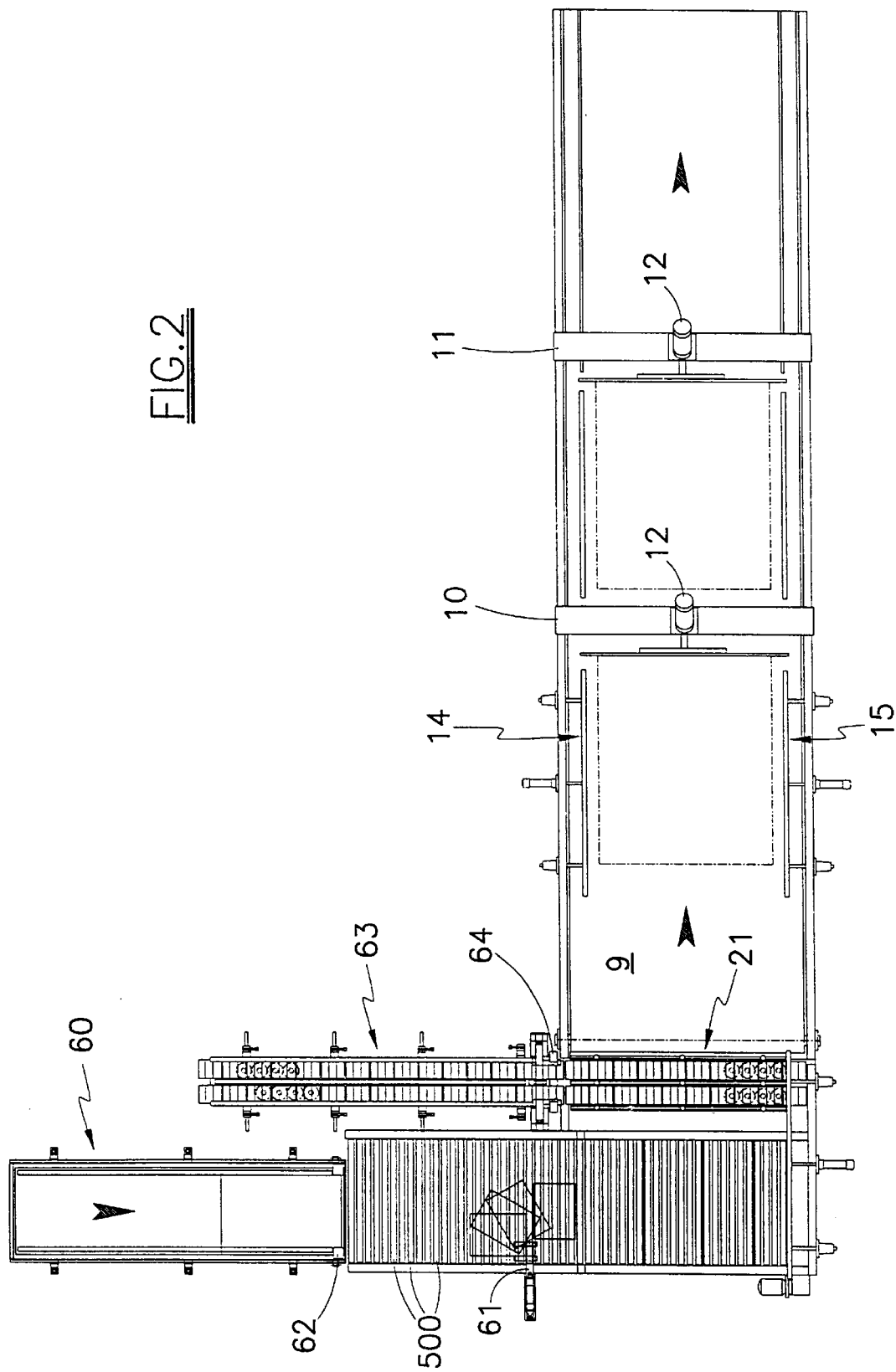
FIG. 2 is a plan view of FIG. 1.

The figures show a device 1 for feeding alternatively boxes 2 or bottles 3, or similar products. The device 1 comprises an external frame 4 having two equal bases 40 each provided with four adjustable identical feet 41. A vertical upright member 42 extends from each of the bases 40. At their top, the two uprights 42 support two equal longitudinal, parallel opposing structural sections 43. The vertical upright member 42 also support two projecting brackets 44 supporting the product row-forming means, described hereinafter. The means supported by the projecting brackets 44 comprise, in succession, a first conveyor 5 having a movable conveying member for the boxes 2, a boxlike member 6 the upper surface of which is coplanar with the upper branch of the conveyor 5, and a second conveyor 7 for conveying the bottles 3.

Specifically, the movable member of the conveyor 5 consists of a motorized roller table 50 formed from a succession of rollers 500. It should be noted that the distance between two successive rollers 500 is such as to allow passage of a movable wall 501, the purpose of which is to maintain two successive boxes 2 spaced apart by a few centimeters in order to improve their manoeuvrability during layer formation.

In contrast, the conveyor 7 comprises two chains 70 with parallel space-apart slats which pass endlessly about end wheels, not shown, and driven by a geared motor of known type.

To the side of the conveyor 7 there is provided a frame 8 for supporting a third belt conveyor 9 the travel direction of which is perpendicular to that of the conveyors 5 and 7, and of which the upper branch defines the forming surface for the layers which are then fed to the palletizing plant. The upper branch of the conveyor 9 is coplanar with the upper branches of the conveyors 5 and 7. The conveyor 9 is driven by a geared motor 90, shown in FIG. 1.

The frame 8 also supports two inverted U-shaped frames 10 and 11, each of which centrally supports a cylinder-piston unit 12, to the rod 120 of which there is fixed a plate 121 which supports a transverse bar 13 parallel to the advancement plane of the conveyor 9 and which, when in its lowered position, defines the front end of a layer.

The frame 8 is also provided with equal and opposite devices 14 and 15 for laterally compacting the layer of products to be palletized.

Each of said equal devices 14 and 15 is fixed to the frame 8 by means of two identical brackets 16.

More specifically, each bracket 16 supports a sleeve 17 of horizontal axis for guiding a rod 18, to that end overlying the belt of which there is fixed a plate (not shown) supporting two equal and parallel superposed bars 19 for compacting the layer. The bars 19 can be moved horizontally, at least one of them being hinged to the rod of the double-acting cylinder-piston unit 20, which is fixed to the frame 8 by a third bracket, not shown.

When a row of products has been formed on the conveyor 5 or on the conveyor 7, this row is transferred onto the conveyor belt 9 by the pusher 21 supported by the motorized carriage 22 which slides via wheels 23 on suitable guides 230 supported by the structural sections 43.

The pusher 21 can also be moved vertically by two equal vertical rods 24 provided with a rack, in each of which there engages the pinion 25 connected to the shaft 26 of a usual geared motor 27. As an alternative, not shown, the pusher 21 is guided by two vertical rods and raised by two flat belts, each passing about a drum.

The pusher 21 comprises a frame 210, to the upper side of which the two rods 24 are fixed by known means, and which on its underside supports nine equal vertical rods 28 arranged in three parallel rows 29, 30 and 31. The rods 28 of the row 29 are joined together by two transverse parallel bars 32 positioned on the same side of the rods, whereas the rods 28 of the row 30 are joined together by two pairs of transverse parallel bars 33 and 34 positioned on both sides of the rods. Finally, with reference to FIG. 6, the row 31 of rods 28 supports a pair of superposed parallel bars 35 on the left side in FIG. 6, and a single bar 36 of greater thickness on the right side.

Figure 3:
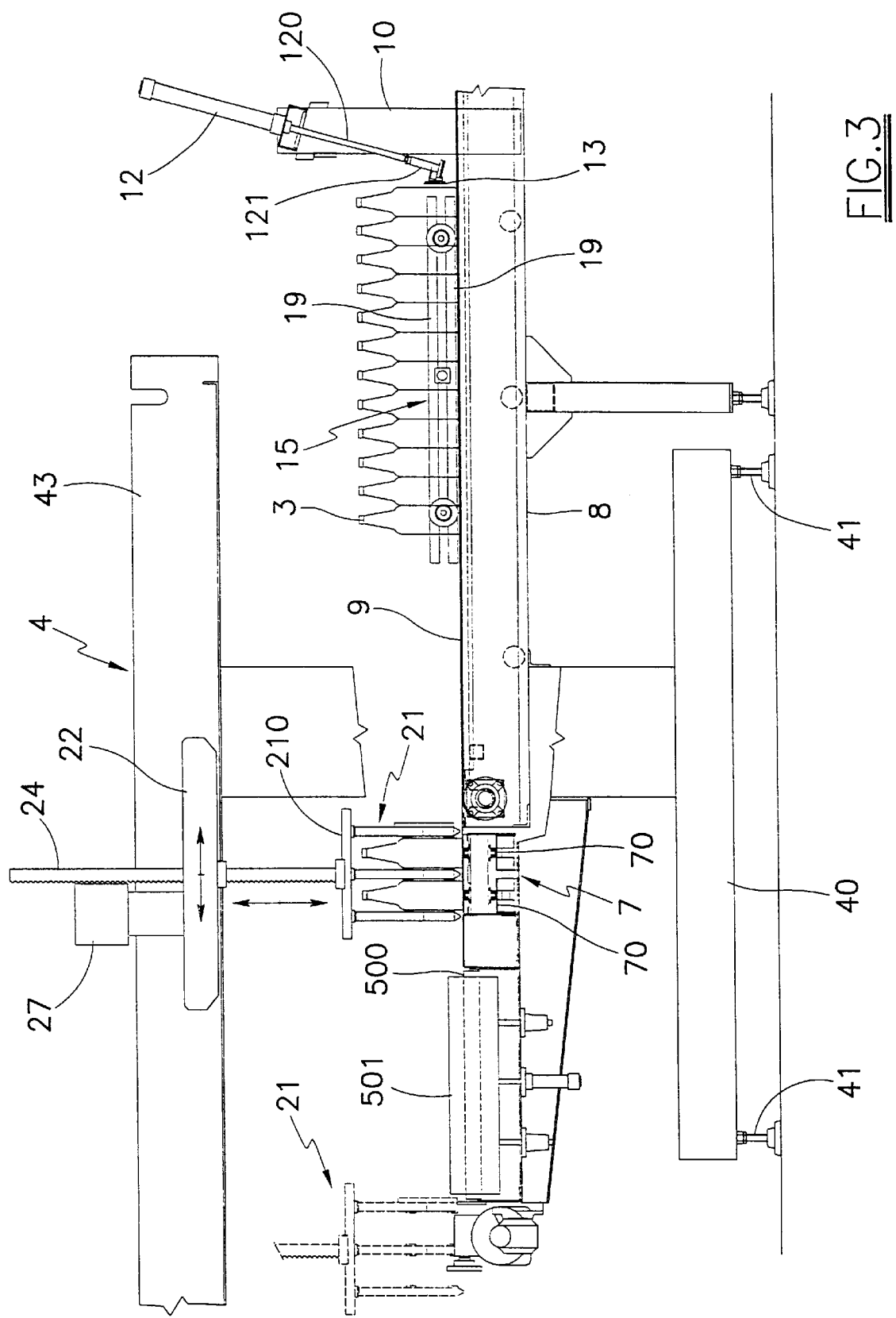
FIG. 3 is an enlarged view of FIG. 1.
Figure 4:
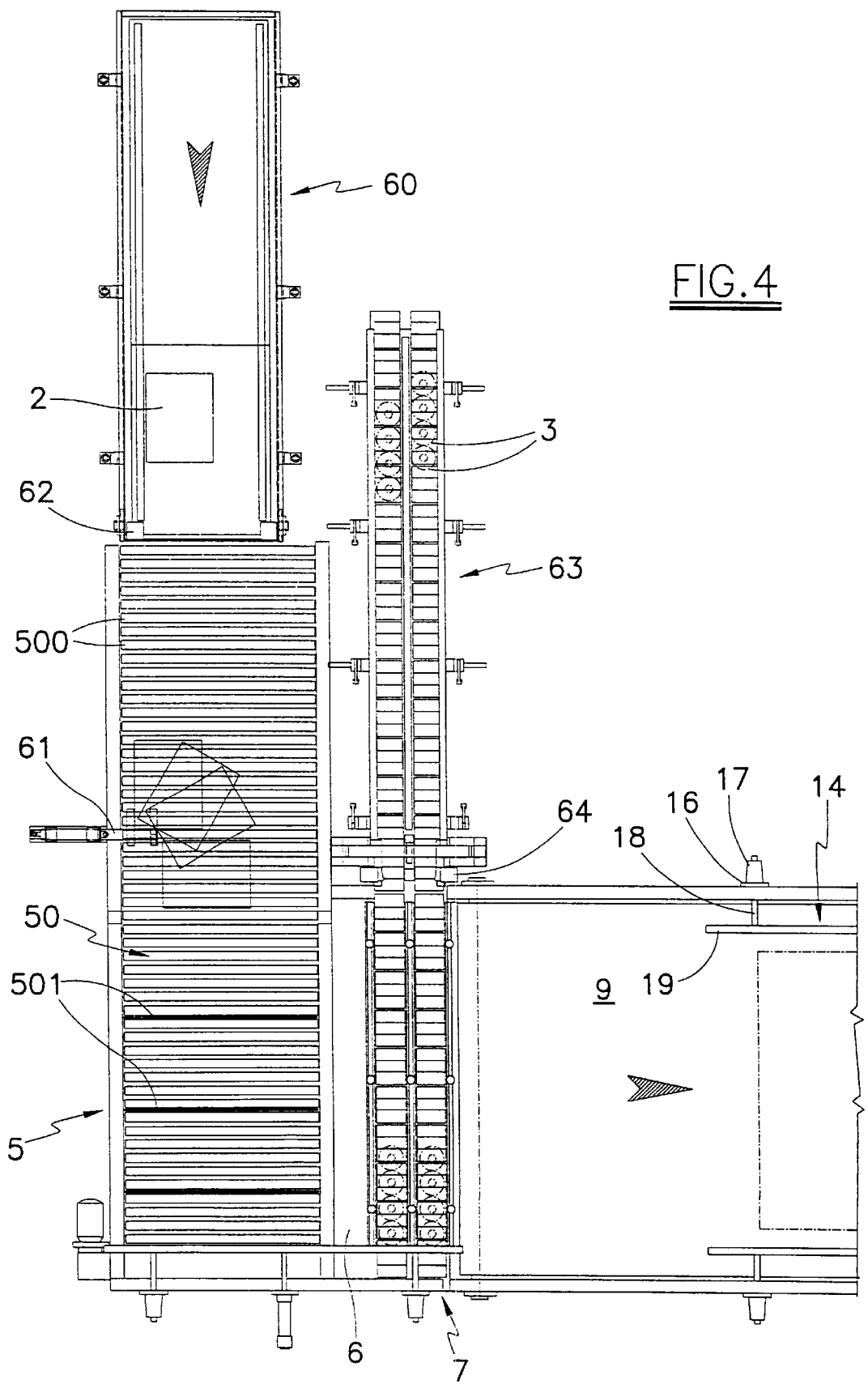
FIG. 4 is an enlarged view of FIG. 2.
Figure 5:
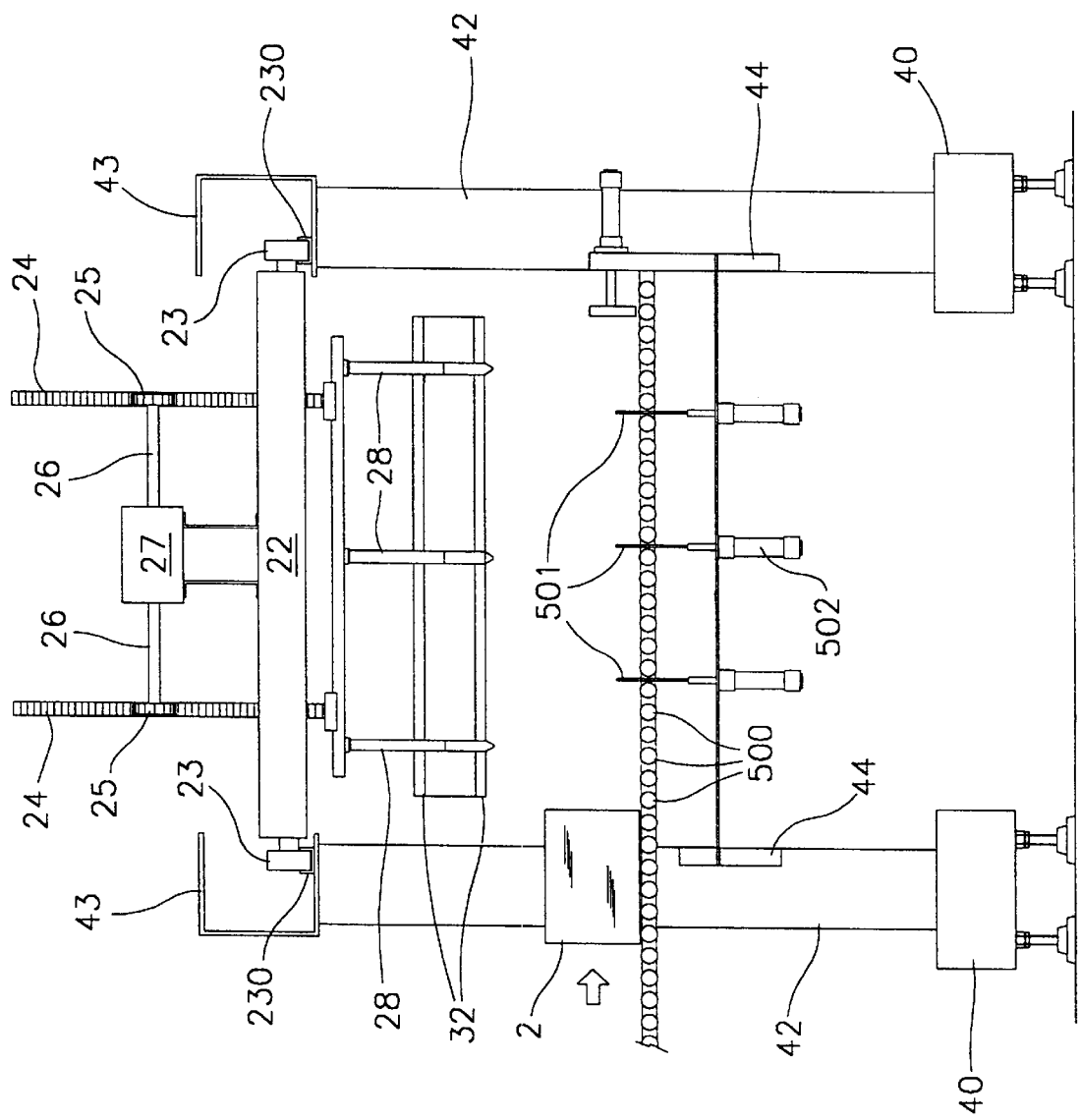
FIG. 5 is a section on the plane V—V of FIG. 1.

This latter bar 36 is used by the invention to urge the row of boxes formed on the conveyor 5 onto the conveyor belt 9. With reference to FIGS. 1 and 3 the boxes are fed to the conveyor 5 by a rearward-positioned usual conveyor 60 having a travel speed less than the travel speed of the conveyor 5 in order to space the boxes (2) apart when they arrive at conveyor 5, in order, if desired, to enable the boxes to be rotated through 90° by a usual pneumatic positioner. The number of boxes rotated depends on their size and shape and on the dimensions of the pallet surface. This rotation is necessary to construct a layer of adjacent boxes formed from the greatest possible number of boxes compatible with tile pallet surface area.

It should be noted that in proximity to that edge of the conveyor 60 in contact with the conveyor 5 there is provided a counter device 62 which counts the number of objects transiting. The counter device 62 is entirely usual and can be formed from photoelectric cells or similar means.

In contrast, bottles are fed to the slat conveyor 7 by a rearward-positioned conveyor 63 which is entirely similar to the conveyor 7 itself. At that edge adjacent to the edge of the conveyor 7, the conveyor 63 includes a counter device 64 which counts the bottles fed to the conveyor 7. The counter device 64 is entirely similar to the aforedescribed counter device 62.

All the plant drive and mover means are controlled by a microprocessor programmed to provide the following operation. Assuming boxes are to be palletized, the bottle conveyor 7 will be empty and not in operation, neither will its rearward-positioned conveyor 63.

The operator keys into the microprocessor the dimensions of the boxes to be palletized and the dimensions of the pallet surface. The processor determines the number of boxes to form each layer and any required rotation of one or more boxes in a given row by the pneumatic positioner 61.

The boxes of each row are separated from each other by the transverse movable walls 501, each of which is moved vertically by an underlying cylinder-piston unit 502 to separate the boxes 2 from each other so that they offer no hindrance when being brought into mutual contact on the belt 9.

When a row of boxes 2 has been formed of a number depending on the box dimensions, the pusher 21 is positioned to the left of said row as shown by dashed lines in FIG. 3, and pushes the boxes onto the conveyor belt 9, which by advancing carries them against the transverse bar 13. The process is repeated a number of times equal to the number of box rows which are to form a layer.

When the layer is complete the devices 14 and 15 laterally compact the layer, after which the bar 13 rises to enable the belt 9 to carry the layer formed of boxes to the accumulation surface stage of the palletizing plant. The process is repeated identically for each layer.

If layers of bottles are to be formed, the belts 5 and 60 are not used.

In this case the product 63 and product 7 form two rows of bottles. When both the rows are complete the pusher 21 pushes them onto the conveyor belt 9, where it is raised and returned to the position shown in FIG. 3.

The advancing belt 9 carries the two parallel rows against the transverse bar 13.

When the layer is complete the bar 13 is raised and the conveyor carries the layer of bottles formed as described to the next stage of the palletizing plant, and the layer forming process is repeated identically.

The plant shows two bars 13 for stoppage on the belt 9, to enable a layer of objects to pause upstream of the stacking operations.

What is claimed is:

1. A device for conveying products to a palletizing plant which comprises an accumulation surface arranged to receive lines of products at least two, substantially parallel coplanar conveyor means of different type disposed side-by-side for accommodating at least one row of different products on each conveyor means, each of said conveyors means having a downstream end positioned in front of the accumulation surface a pusher means operatively associated with said conveyor means and mounted for vertical movement and movement in the axial direction of the accumulating surface and thus perpendicular to the axis of the conveyor means, whereby products conveyed on the conveyor means can be selectively transferred by the pusher means to the accumulation surface.

2. The device as claimed in claim 1, wherein at least one of said at least two conveyor means is a slat conveyor.

3. The device as claimed in claim 1, wherein at least one of said at least two conveyor means is a roller conveyor.

4. The device as claimed in claim 3, wherein at least one wall is provided which, when driven by an underlying cylinder-piston unit, rises between two adjacent rollers.

5. The device as claimed in claim 1, wherein the accumulation surface is a belt conveyor.

6. The device as claimed in claim 1, wherein the pusher means is a carriage slidable in the direction of the axis of the accumulation surface, said carriage being driven by a geared motor and containing a slidable, vertical shaft which structurally interacts with the products to be moved.

7. The device as claimed in claim 6, wherein the slidable, vertical shaft is provided with a rack which engages with a drive pinion operatively associated with a geared electric motor.

8. The device as claimed in claim 7, wherein the rack includes a horizontal plate which supports a plurality of rods disposed perpendicular to the axis of the accumulation surface and defining a plurality of lines of vertical rod-supporting supporting crosspieces disposed parallel to said lines.

9. The device as claimed in claim 8, wherein at least one of the lines close to the accumulation surface supports an external crosspiece facing the accumulation surface.

10. The device as claimed in claim 1, wherein the product accumulation surface is overlaid by at least one bridge structure from which there descends a rod of a cylinder-piston unit, the end of which carries, for the products advancing on the accumulation surface, a stop crosspiece which by the action of said cylinder-piston unit can assume a lowered position in which it intercepts the products and a raised position in which it allows the products to pass.

11. The device as claimed in claim 1, wherein two parallel guides are positioned at the sides of the accumulation surface, of which at least one of the guides is associated with means for driving it towards the center of the accumulation surface, and which are provided to compact the layer of products lying on the accumulation surface.

12. The device as claimed in claim 1, wherein a roller conveyor is positioned in front of the accumulation surface and programmed control means are associated with the roller conveyor for rotating through 90° those products lying on the roller conveyor.

13. The device as claimed in claim 1, wherein additional feed conveying means are positioned at the upstream end of the coplanar conveying means for introducing the products to the coplanar means at variable speeds.

* * * * *